United States Patent
Parks et al.

[11] Patent Number: 6,113,033
[45] Date of Patent: Sep. 5, 2000

[54] COMBINED FLYWHEEL ENERGY STORAGE AND ATTITUDE CONTROL APPARATUS FOR SPACECRAFT

[75] Inventors: Thomas R. Parks, Hermosa Beach; John W. Smay, Redondo Beach; John P. Harrell, Mission Viejo, all of Calif.

[73] Assignee: Hughes Electronics Corporation, El Segundo, Calif.

[21] Appl. No.: 09/244,695

[22] Filed: Feb. 4, 1999

[51] Int. Cl.⁷ ........................................ B64G 1/28
[52] U.S. Cl. .................................................. 244/165
[58] Field of Search ........................ 244/164, 165, 244/171

[56] References Cited

U.S. PATENT DOCUMENTS

| | | | |
|---|---|---|---|
| 4,071,211 | 1/1978 | Muhlfelder et al. | 244/165 |
| 4,078,748 | 3/1978 | Sen | 244/165 X |
| 6,003,818 | 12/1999 | Shah et al. | 244/165 |
| 6,019,319 | 1/2000 | Falbel | 244/165 |

*Primary Examiner*—Robert P. Swiatek
*Attorney, Agent, or Firm*—Terje Gudmestad; M. W. Sales

[57] ABSTRACT

An apparatus for storing energy and actuating the attitude of a spacecraft includes a first gimbaled flywheel assembly having a first rotor rotating in a first direction, and a second gimbaled flywheel assembly having a second rotor rotating in a second direction opposing the first direction. The first and second gimbaled flywheel assemblies are adapted to store and release energy and to actuate the attitude of the spacecraft. The apparatus includes one or more non-gimbaled counter-rotating flywheel pairs that are adapted to store and release energy.

12 Claims, 5 Drawing Sheets

COMBINED FLYWHEEL ENERGY STORAGE AND ATTITUDE CONTROL APPARATUS FOR SPACECRAFT

BACKGROUND OF THE INVENTION (a) Field of the Invention

The present invention relates generally to combined flywheel energy storage and attitude control systems for spacecraft. More particularly, it relates to a combined flywheel energy and attitude control system having both gimbaled and non-gimbaled flywheel pairs.

(b) Description of Related Art

The use of flywheels to provide energy storage on board spacecrafts is well known in the art. Recent advances in materials and electronics have increased the available specific energy of flywheel energy storage (FES) systems beyond that of electrochemical batteries, which have traditionally been used to store energy on board spacecrafts. Unlike electrochemical energy storage systems, energy storage and retrieval utilizing a flywheel system affects the attitude steering and momentum control of the spacecraft. Therefore, it is desirable to integrate the control of attitude steering and momentum management with the control of energy storage in the flywheel system of the spacecraft.

Combined FES and attitude control systems are also known in the art. For example, an exemplary combined FES and attitude control system is disclosed in U.S. Pat. No. 5,611,505 to Smay. Typically, these combined systems use counter-rotating pairs of flywheels that are gimbaled on two axes. However, for the emerging market of high power spacecraft, the number of flywheels (i.e., momentum) needed for energy storage far exceeds that required for attitude control. As a result, in these high-power applications one or more of the flywheel pairs do not have to be actuated for attitude control purposes, making their associated gimbaling hardware unnecessary.

SUMMARY OF THE INVENTION

In accordance with the present invention, an apparatus for storing energy and actuating the attitude of a spacecraft includes a first gimbaled flywheel assembly having a first rotor rotating in a first direction, and a second gimbaled flywheel assembly having a second rotor rotating in a second direction opposing the first direction. The first and second gimbaled flywheel assemblies are adapted to store and release energy and to actuate the attitude of the spacecraft. The apparatus includes one or more non-gimbaled counter-rotating flywheel pairs that are adapted to store and release energy.

In some embodiments, the spin axes of the flywheels are all nominally co-aligned with a pitch axis of the spacecraft and may further be adapted to gimbal about two transverse axes.

In other embodiments, a redundant gimbaled flywheel assembly is included. The redundant gimbaled flywheel assembly has a third rotor that may be adapted to rotate in the first and second directions.

In still other embodiments, the flywheel rotors may have lengths optimized for the particular power requirements of the spacecraft.

The invention itself, together with further objects and attendant advantages, will best be understood by reference to the following detailed description, taken in conjunction with the accompanying drawings.

DESCRIPTION OF THE PREFERRED EMBODIMENTS

Figure 1:
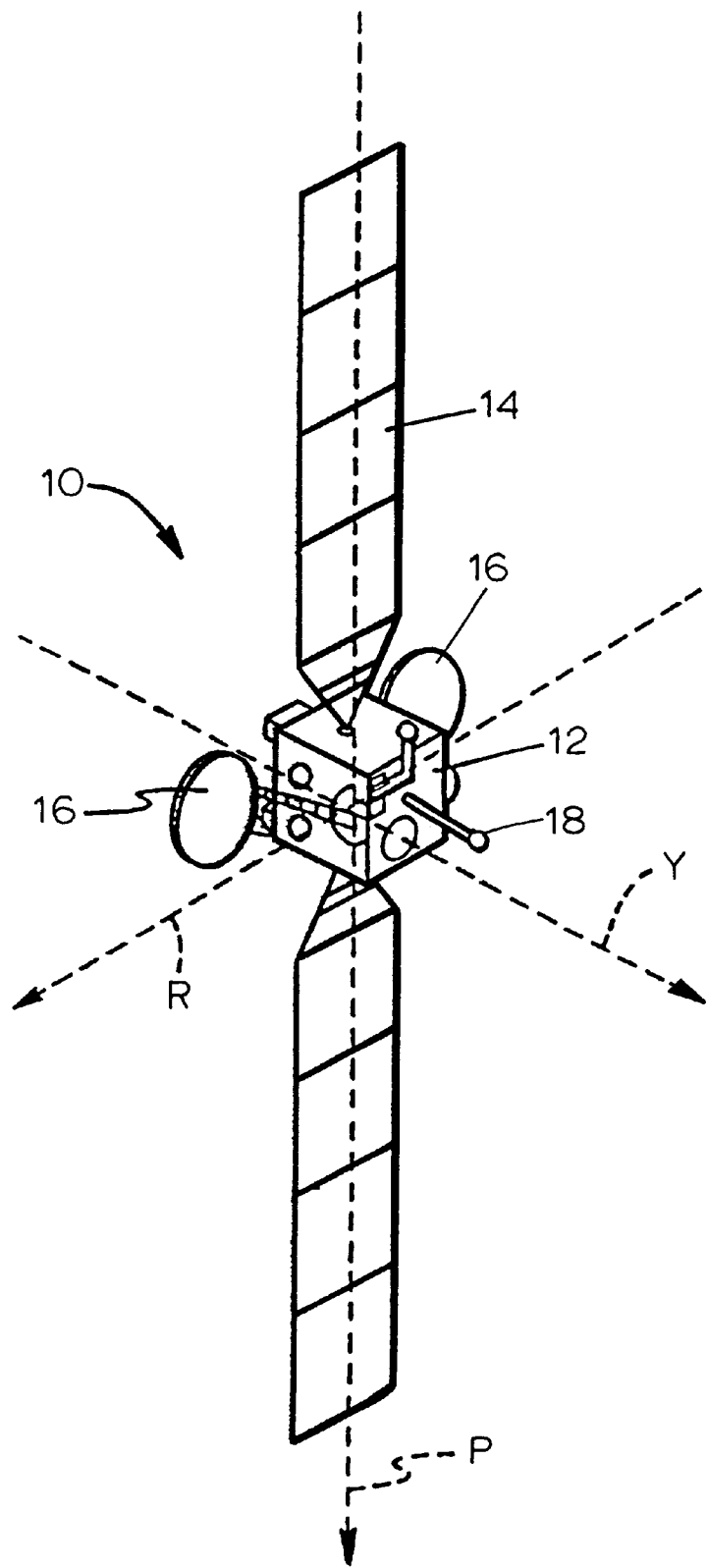
FIG. 1 illustrates a satellite or spacecraft capable of utilizing the present invention.

Illustrated in FIG. 1 is a conventional three-axis stabilized satellite or spacecraft 10. The satellite 10 has a main body 12, a pair of solar panels 14, a plurality of antennas 16, and a command antenna 18, which receives commands from a control ground station (not shown).

FIG. 1 also illustrates the three axes of the spacecraft 10. The pitch axis P is substantially vertical and is typically parallel to the rotation axis of the solar panels 14. The roll axis R and yaw axis Y are perpendicular to the pitch axis P and lie in the directions and planes shown (i.e., they are all preferably orthogonal). The antenna 18 points to the Earth along the yaw axis Y.

Figure 2:
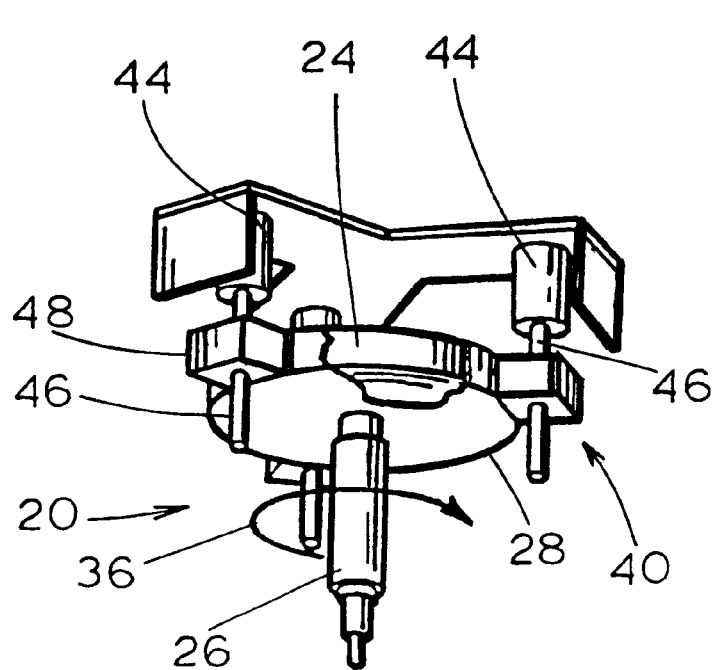
FIG. 2 illustrates a pair of gimbaled flywheels that may be utilized with the present invention.
Figure 2:
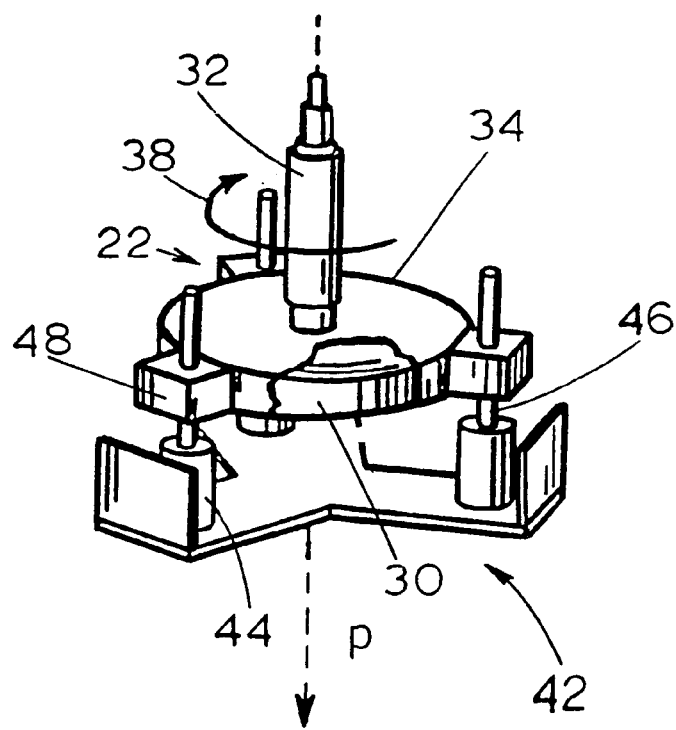

By way of example only, FIG. 2 illustrates a pair of gimbaled flywheel assemblies 20, 22 may be disposed within the body 12 of the spacecraft 10 to provide combined energy storage and attitude steering/actuation functions. The flywheel assemblies 20, 22 are preferably positioned with their nominal spin axes co-aligned along the spacecraft pitch axis P.

The flywheel assembly 20 includes a flywheel 24 that is mounted on a shaft 26 within a housing 28. Similarly, the flywheel assembly 22 includes a flywheel 30 that is mounted on a shaft 32 within a housing 34. The flywheels 24 and 30 are magnetically suspended and rotated about the axis of the shafts 26 and 32 in the directions indicated by curved arrows 36 and 38.

The flywheel assemblies 20 and 22 also include a plurality of motors 44 and associated gimbal drive components such as jackscrews 46. The housings 28 and 34 may include a plurality of flanges 48 each having a threaded hole for engagement with an associated jackscrew 46. Using the motors 44, the flywheels 24 and 30 can be tilted about the roll axis R and the yaw axis Y of the spacecraft 10.

Typically, the shafts 26 and 32 of the flywheel assemblies 20 and 22 are coupled to one or more generator/motor assemblies (not shown) that transduce electrical energy into stored mechanical energy and stored mechanical energy back into electrical energy.

In general, the energy storage function of the spacecraft 10 is accomplished by collecting solar energy in the solar panels 14 and storing it as mechanical energy in the rotating mass of the flywheels 24 and 30. When the solar panels 14 are receiving sunlight, they provide an electrical output that is used to power the generator/motor assemblies that are coupled to the shafts 26 and 32. In this operational mode, the generator/motor assemblies operate as motors and convert electrical energy into stored mechanical energy (i.e., momentum) by increasing the rotational speed of the flywheels 24 and 30.

Conversely, energy can be extracted from the rotating flywheels 24 and 30 by operating the generator/motor assemblies as generators. In this operational mode, the generator/motor assemblies operate as generators driven by the flywheels 24 and 30 and convert rotational speed (i.e., momentum) into electrical energy. Accordingly, as energy is extracted, the rotational speed and momentum of the flywheels 24 and 30 decrease.

The total storage capacity of the flywheels 24 and 30, given a fixed inertia, is a function of the minimum and maximum limits on their rotational speed. High specific energy is made possible by using strong lightweight materials, such as carbon fiber, for the fabrication of the flywheels 24 and 30. Using the appropriate materials, rotational speeds greater than 100,000 rpm and specific energy levels exceeding 100 watt-hours/kg are possible.

In addition to providing a way of storing energy on board the spacecraft 10, the flywheel assemblies 20 and 22 can be used to actuate the attitude of the spacecraft 10. Spacecraft attitude steering torques are generated along three axes by commanding differential flywheel acceleration about the spin axis (e.g., pitch axis P) and by torquing (i.e., tilting) the flywheels 24 and 30 about the transverse gimbal axes (e.g., the roll axis R and yaw axis Y).

For pitch steering, the generator/motor assemblies operate as motors and apply rotational torques to the flywheels 24 and 30. These motor torques react on the spacecraft 10 to produce complementary pitch steering actuations. For roll or yaw attitude steering, one or both of the flywheels 24 and 30 may be tilted about their transverse axes gimbals. This tilting rotates the spin momentum vectors in the body 12 of the spacecraft 10, and thus, in accordance with the conservation of angular momentum, imparts momentum to the spacecraft 10 about the roll axis R and/or the yaw axis Y.

Various flywheel gimbaling control strategies may be used to actuate and stabilize the attitude of the spacecraft 10. For example, a momentum bias may be required to stabilize the attitude of the spacecraft 10 in response to environmental torques. In general, a stabilizing momentum bias may be achieved by adjusting the differential speed of the flywheels about their spin axes and by appropriately tilting one or both flywheels about the transverse axes. When there is a momentum bias, the flywheels 24 and 30 may be gimbaled (tilted) as a locked pair for fine resolution torquing, gimbaled singly for more torque authority, or gimbaled in opposite directions for maximum torque authority. When there is no momentum bias, attitude steering may be affected by gimbaling one wheel, or gimbaling two wheels in opposite directions. Also, with or without momentum bias, the flywheels 24 and 30 may be spun in the same direction to effect larger changes in the momentum of the spacecraft 10 than would be possible with counter-rotating flywheels.

As known in the art, the energy storage and attitude actuation functions of FES-based systems are inherently interactive. For example, a pitch steering actuation of the spacecraft 10 is achieved by increasing or decreasing the differential flywheel speed, which necessarily increases or decreases the absolute momentum (i.e., energy) stored in the flywheels 24 and 30. Alternatively, if energy is being stored or extracted from the flywheels 24 and 30 their absolute momentum must necessarily increase or decrease, which, if allowed to increase differentially between the flywheels 24 and 30, may impart an undesirable pitch steering actuation to the spacecraft 10. Known control schemes can eliminate these undesirable interactions between the energy storage/retrieval and attitude actuation functions. For instance, during energy storage or extraction the momentum of flywheels 24 and 30 may be changed in tandem so that the net change in the differential momentum remains substantially close to zero.

High-power spacecraft applications may utilize gimbaled FES hardware and control techniques similar to those outlined above, but typically require multiple pairs of flywheels to meet the increased energy demand of the spacecraft. The present invention is particularly suited for high-power spacecraft applications where the aggregate flywheel momentum required to satisfy energy demand far exceeds the momentum required for attitude actuation.

The present invention optimizes the use of gimbaling hardware so that only the flywheel pairs needed for attitude actuation are gimbaled. The present invention optimally combines gimbaled and non-gimbaled flywheel pairs to minimize spacecraft weight and costs associated with the combined FES and attitude control system.

In accordance with the present invention, the gimbaled flywheel pairs provide both attitude actuation and energy storage and the non-gimbaled flywheel pairs preferably have a net zero momentum and provide energy storage capacity only. In addition, one or more redundant gimbaled flywheels may be provided as a backup for any failed gimbaled or non-gimbaled flywheel assembly.

Figure 3:
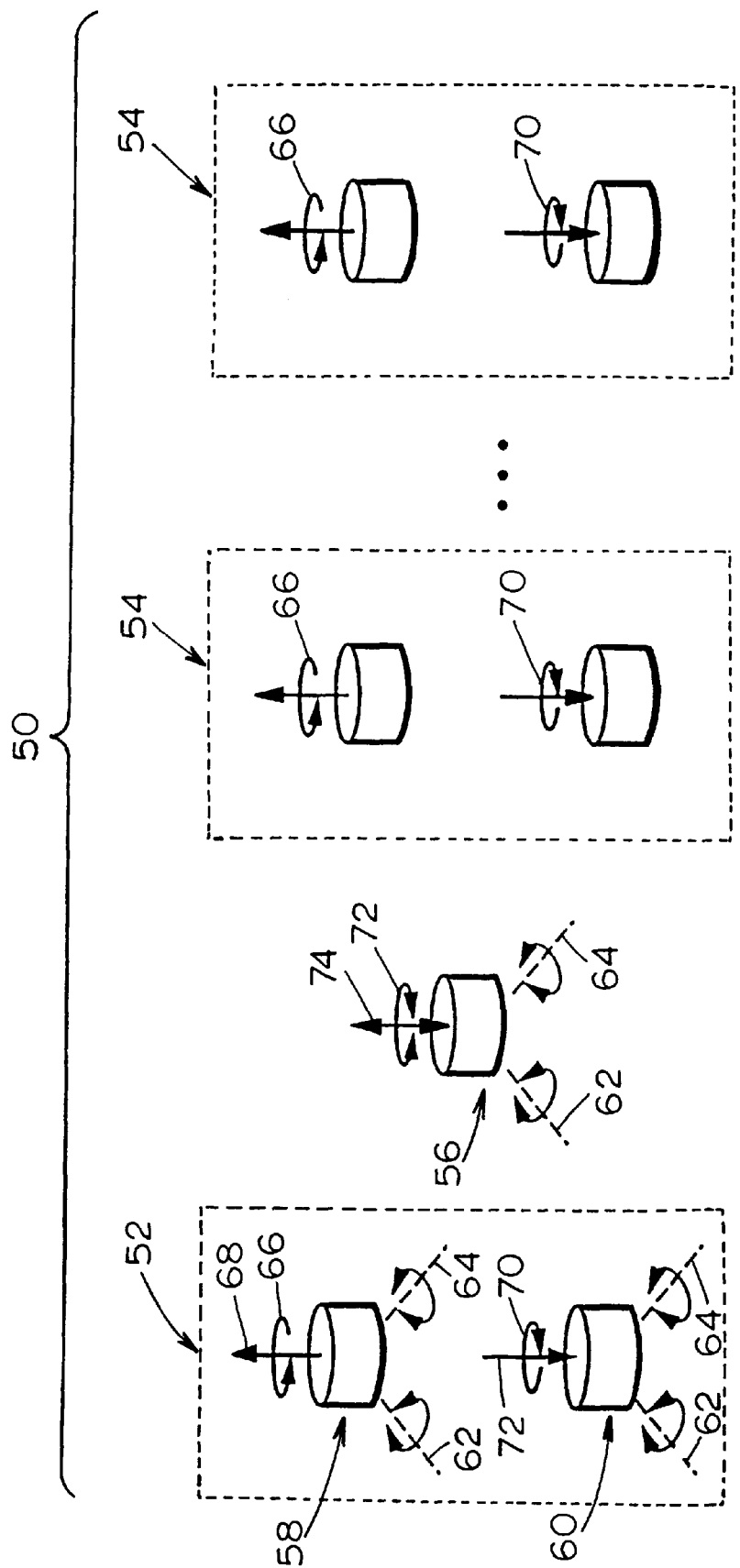
FIG. 3 illustrates a combined flywheel energy storage and attitude control system architecture in accordance with the present invention.

Now turning to FIG. 3, a combined FES and attitude actuation system architecture 50 in accordance with the present invention is illustrated. The architecture 50 is particularly adapted for use with flywheel rotor assemblies that are mounted in separate housings. The architecture 50 includes a counter-rotating pair of gimbaled flywheels 52, one or more pairs of counter-rotating non-gimbaled flywheels 54, and a redundant gimbaled flywheel 56. The spin axes of all the flywheels are preferably co-aligned with the pitch axis P of the spacecraft 10. However, in some applications it may be preferable to co-align the spin axes of the flywheels with the roll axis R, the yaw axis Y, or some other arbitrary axis of the spacecraft 10.

The counter-rotating pair of flywheels 52 consists of a first flywheel assembly 58 and a second flywheel assembly 60 that are each gimbaled on transverse axes 62 and 64. The transverse axes 62 and 64 are preferably orthogonal to each other and to the co-aligned spin axes of the flywheels. For example, the transverse axes 62 and 64 may correspond to the roll axis R and yaw axis Y of the spacecraft 10. The first flywheel 58 rotates as indicated by a first arrow 66 and produces a first momentum 68. The second flywheel 60 rotates as indicated by a second arrow 70 and produces a second momentum 72 that opposes the first momentum 68.

Using known control methods, the first and second flywheels 58 and 60 may be used to actuate the attitude of the spacecraft 10 along its three axes. For example, control may be achieved by commanding differential flywheel acceleration about the spin axis (pitch axis P) and by torquing (i.e., tilting) the flywheels 58 and 60 about the transverse gimbal axes 62 and 64 (i.e., the roll axis R and yaw axis Y). The conservation of angular momentum requires that reaction torques and momentums are imparted to the spacecraft 10, thereby producing changes in the attitude of the spacecraft 10.

In addition to providing an attitude actuation function, the first and second flywheels 58 and 60 may be used to store energy for the spacecraft 10. As described earlier, energy is stored and retrieved in flywheel pairs by increasing or decreasing the absolute momentum of the pairs. To prevent the energy storage and retrieval functions from producing unintended attitude actuations the differential flywheel speed must be maintained during energy storage and retrieval to provide only the momentum bias needed to counteract environmental torques, if any.

The non-gimbaled flywheel pairs 54 are counter-rotating in the directions indicated by the arrows 66 and 70. Preferably, the non-gimbaled pairs 54 serve only an energy storage function and are controlled to provide no net momentums for attitude actuation purposes. In some applications, though, it may be desirable to vary the differential speeds of the non-gimbaled pairs to provide additional torque authority for attitude actuations about the spin axes (i.e., the pitch axis P of the spacecraft 10). The number of non-gimbaled flywheel pairs 54 required will vary with the particular energy requirements of the application.

The redundant gimbaled flywheel 56 can rotate in the directions indicated by the third arrow 72 to produce a third momentum 74. The redundant flywheel 56 can be used to replace any failed gimbaled or non-gimbaled flywheel or may alternatively be brought into operation periodically to reduce the duty of the other flywheels and extend their operating life. It should be recognized that the redundant gimbaled flywheel 56 may optionally be eliminated from the architecture 50 without departing from the spirit of the invention.

Figure 4:
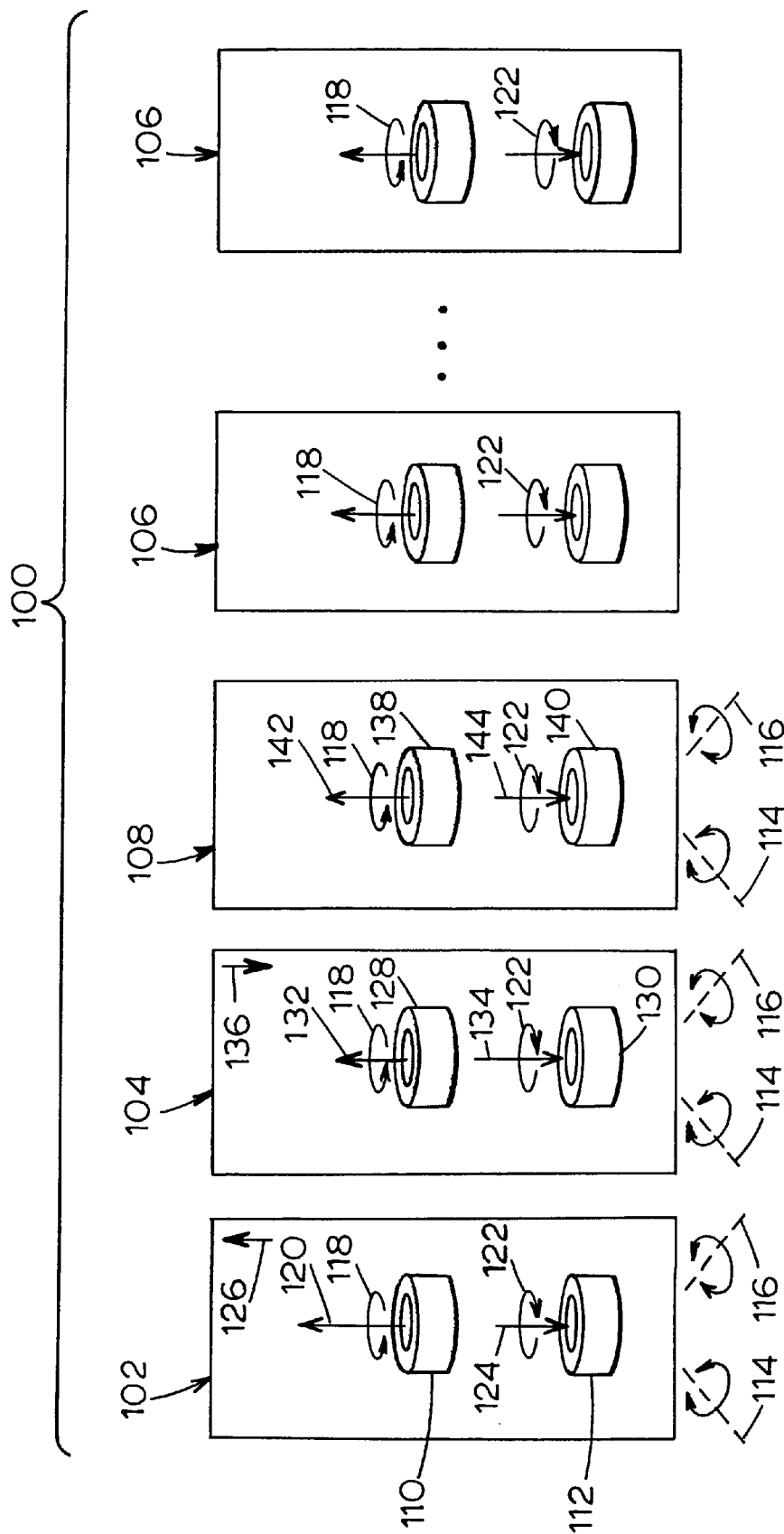
FIG. 4 illustrates another combined flywheel energy storage and attitude control system architecture in accordance with the present invention.

Illustrated in FIG. 4 is another FES and attitude actuation system architecture 100 in accordance with the present invention. The architecture 100 is particularly adapted for use with flywheel assemblies that contain counter-rotating pairs of rotors within a shared housing. The architecture 100 includes a first gimbaled flywheel assembly 102, a second gimbaled flywheel assembly 104, one or more non-gimbaled flywheel assemblies 106, and a redundant gimbaled flywheel assembly 108. The nominal spin axes of all the flywheels are preferably co-aligned with the pitch axis P of the spacecraft 10. However, in some applications it may be preferable to co-align the nominal spin axes of the flywheels with the roll axis R, the yaw axis Y, or some other arbitrary axis of the spacecraft 10.

The first gimbaled flywheel assembly 102 contains a first rotor 110 and a second rotor 112 mounted within a single housing (not shown) that is gimbaled as a unit about transverse axes 114 and 116. Thus, the first and second rotors 110 and 112 are gimbaled in tandem about the transverse axes 114 and 116. The transverse axes 114 and 116 are preferably orthogonal to each other and to the co-aligned spin axes of the flywheels. For example, the transverse axes 114 and 116 may correspond to the roll axis R and yaw axis Y of the spacecraft 10. The first rotor 110 rotates as indicated by a first arrow 118 and produces a first momentum 120. The second rotor 112 rotates as indicated by a second arrow 122 and produces a second momentum 124 that opposes the first momentum 120. A differential rotational speed or wheel inertia may be maintained between the first and second rotors 110 and 112 so that the first and second momentums 120 and 122 are unequal and result in a first momentum bias 126.

The second gimbaled flywheel assembly 104 contains a third rotor 128 and a fourth rotor 130 mounted within a single housing (not shown) that is gimbaled as a unit about transverse axes 114 and 116. Thus, the third and fourth rotors 128 and 130 are gimbaled in tandem about the transverse axes 114 and 116. The third rotor 128 rotates as indicated by the first arrow 118 and produces a third momentum 132. The fourth rotor 130 rotates as indicated by the second arrow 122 and produces a fourth momentum 134 that opposes the first momentum 132. A differential rotational speed or wheel inertia may be maintained between the third and fourth rotors 128 and 130 so that the third and fourth momentums 132 and 134 are unequal and result in a second momentum bias 136.

In operation, the first and second flywheel assemblies 102 and 104 may be viewed as analogous to the first and second flywheels 58 and 60 shown in FIG. 3. In particular, because the first and second rotors 110 and 112 are gimbaled as a tandem pair and the third and fourth rotors 128 and 130 are gimbaled as a tandem pair, each tandem pair of rotors is functionally equivalent to a single rotor having the first and second momentum biases 126 and 136 respectively. Thus, both energy storage and complete three-axis steering/actuation of the spacecraft 10, using the control strategies described in connection with FIG. 3, may be implemented using the first and second flywheel assemblies 102 and 104 shown in FIG. 4.

The non-gimbaled flywheel assemblies 106 contain rotor pairs that counter-rotate in the directions indicated by the arrows 118 and 122. Preferably, the non-gimbaled pairs 106 serve only an energy storage function and are controlled to provide no net momentums for attitude actuation purposes. In some applications, though, it may be desirable to vary the differential speeds of the non-gimbaled pairs to provide additional torque authority for attitude actuations about the spin axes (e.g., the pitch axis P of the spacecraft 10). It should be recognized that the number of non-gimbaled flywheel assemblies 106 needed will vary with the particular energy requirements of the application.

The second flywheel assembly 104 could be eliminated from the architecture 100 while maintaining three-axis steering capability over the spacecraft 10. In practice, the motor/generators coupled to the rotors within the flywheel assemblies 102, 104, and 106 produce relatively small rotational torques about the spin axes (i.e., pitch axis P) of the rotors. As a result, to produce adequate pitch steering torques the architecture 100 includes the second flywheel assembly 104. As indicated, though, the non-gimbaled flywheel assemblies 106 may optionally provide net momentums along the pitch axis P of the spacecraft 10 in addition to their energy storage function. Thus, if used in this manner the non-gimbaled flywheel assemblies can eliminate the need for the second flywheel assembly 104 without sacrificing pitch steering torque authority.

The redundant gimbaled flywheel assembly 108 contains fifth and sixth rotors 138 and 140 that rotate in the directions indicated by the arrows 118 and 122 to produce fifth and sixth momentums 142 and 144 respectively. The redundant flywheel assembly 108 can be used to replace any failed gimbaled or non-gimbaled flywheel assembly, or may alternatively be brought into operation periodically to reduce the duty of the other flywheel assemblies and extend their operating life. It should be recognized that the redundant gimbaled flywheel assembly 108 may optionally be eliminated from the architecture 100 without departing from the spirit of the invention.

In accordance with another aspect of the present invention, the flywheels may incorporate features that facilitate variable sizing of the rotor. This allows further optimization (for each application's energy storage requirement) of the weight and costs associated with a combined FES and attitude control system based on the architectures shown in FIGS. 3 and 4.

Figure 5:
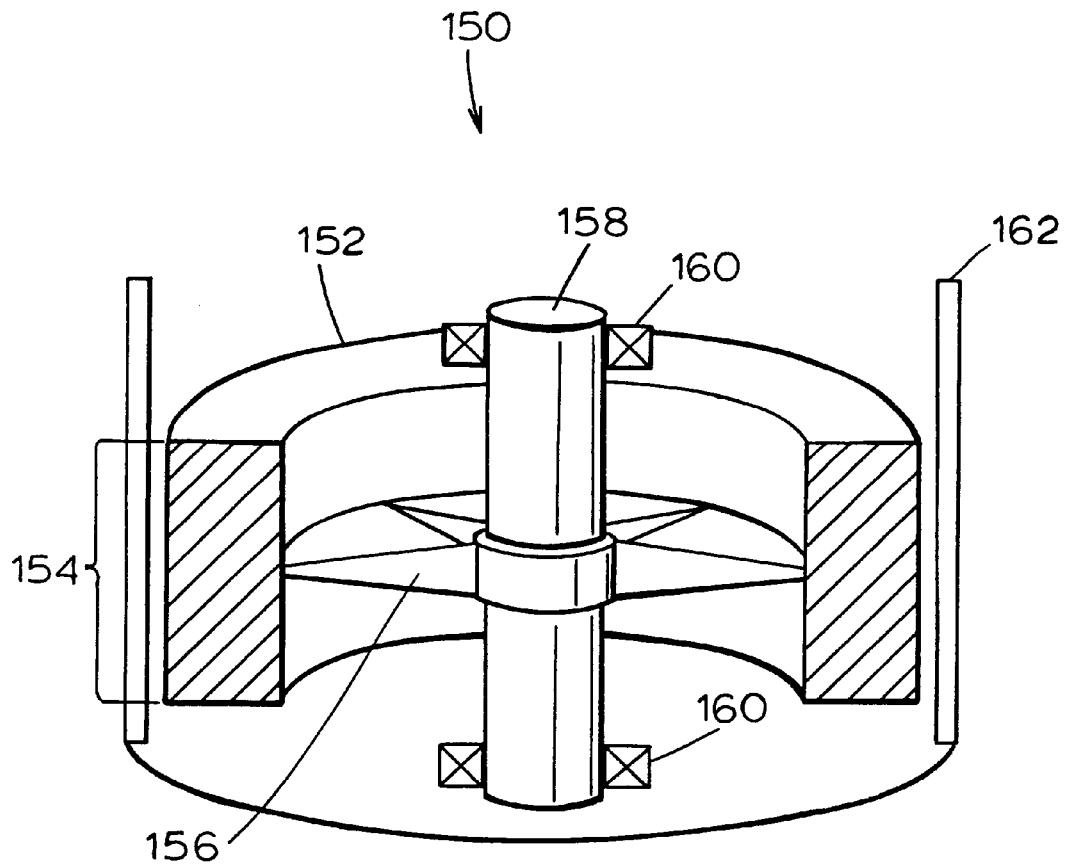
FIG. 5 illustrates a flywheel assembly in accordance with aspects of the present invention.

By way of example only, FIG. 5 illustrates a flywheel assembly that may be used within the FES and attitude control system architectures (shown by way of example in FIGS. 3 and 4) of the present invention. The assembly 150 includes a rotor 152, having a length 152, that is rigidly attached to a hub 156. The hub 156 is fixed to a shaft 158 that rotates in bearings 160. A housing 162 may surround the rotor 152.

The housing 160, hub 156, shaft 158, and bearings 160 are sized and configured to accommodate a wide variation in the rotor length 154. Thus, the rotor length can be adaptively varied to optimally suit a particular application. For example, if the spacecraft 10 requires 25 kw-hrs of energy storage and the maximum length rotor is capable of storing 4 kw-hrs, a total of nine flywheels (eight active plus one redundant) would be required to supply the energy storage capacity of the application. This provides an available energy storage capacity of 32 kw-hrs, which results in an excess capacity of 7 kw-hrs. The optimal energy storage capacity for this application is 3.125 kw-hrs per flywheel. Reducing the rotor length by approximately 22% from its maximum provides the optimal storage capacity (i.e., 3.125 kw-hrs) and reduces the overall flywheel weight by approximately 10 to 15%. In general, because the rotor accounts for a significant portion of the overall flywheel weight, reductions in the rotor length 154 result in substantial proportional reductions in the overall flywheel weight.

The variable rotor length aspect of the present invention provides a further optimization of overall spacecraft costs because material costs are reduced as a result of standardizing and mass-producing components used in the flywheel assembly and launch costs may be reduced by minimizing the flywheel weight for each application.

Of course, it should be understood that a range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. An apparatus for storing energy and actuating the attitude of a spacecraft, comprising:

a first gimbaled flywheel assembly having a first rotor rotating in a first direction;

a second gimbaled flywheel assembly having a second rotor rotating in a second direction opposing the first direction;

the first and second gimbaled flywheel assemblies adapted to store and release energy;

the first and second gimbaled flywheel assemblies further adapted to actuate the attitude of the spacecraft; and one or more non-gimbaled counter-rotating flywheel pairs adapted to store and release energy.

2. The apparatus of claim 1, wherein the non-gimbaled counter-rotating flywheel pairs are further adapted to actuate the attitude of the spacecraft.

3. The apparatus of claim 1, wherein the non-gimbaled counter-rotating flywheel pairs are further adapted to provide a nominal momentum bias to the spacecraft.

4. The apparatus of claim 1, wherein the spin axes of the flywheel assemblies and one or more flywheel pairs are all nominally co-aligned.

5. The apparatus of claim 1, wherein the spin axes of the flywheel assemblies and one or more flywheel pairs are all nominally co-aligned with a pitch axis of the spacecraft.

6. The apparatus of claim 1, wherein the first and second flywheel assemblies are gimbaled about two transverse axes.

7. The apparatus of claim 6, wherein the two transverse axes and a pitch axis of the spacecraft are all mutually orthogonal.

8. The apparatus of claim 1, wherein the first and second flywheel assemblies are adapted to actuate the attitude of the spacecraft about three axes.

9. The apparatus of claim 1, further including a redundant gimbaled flywheel assembly.

10. The apparatus of claim 9, wherein the redundant gimbaled flywheel assembly has a third rotor adapted to rotate in the first and second directions.

11. The apparatus of claim 9, wherein the redundant gimbaled flywheel assembly is gimbaled about two transverse axes.

12. The apparatus of claim 1, wherein the first and second rotors have first and second lengths respectively, the lengths being optimized for the spacecraft.

\* \* \* \* \*